May 10, 1932.  K. O. LEON  1,857,559
MOVING PICTURE APPARATUS
Filed July 30, 1928   4 Sheets-Sheet 1
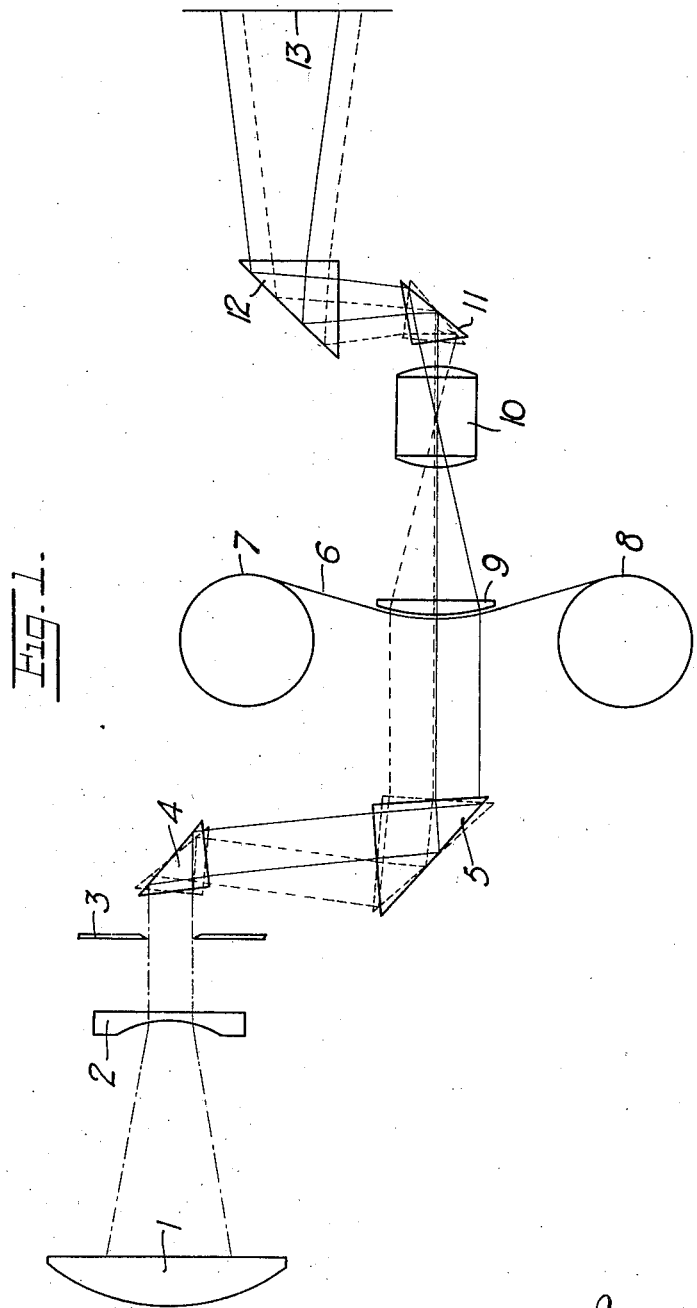

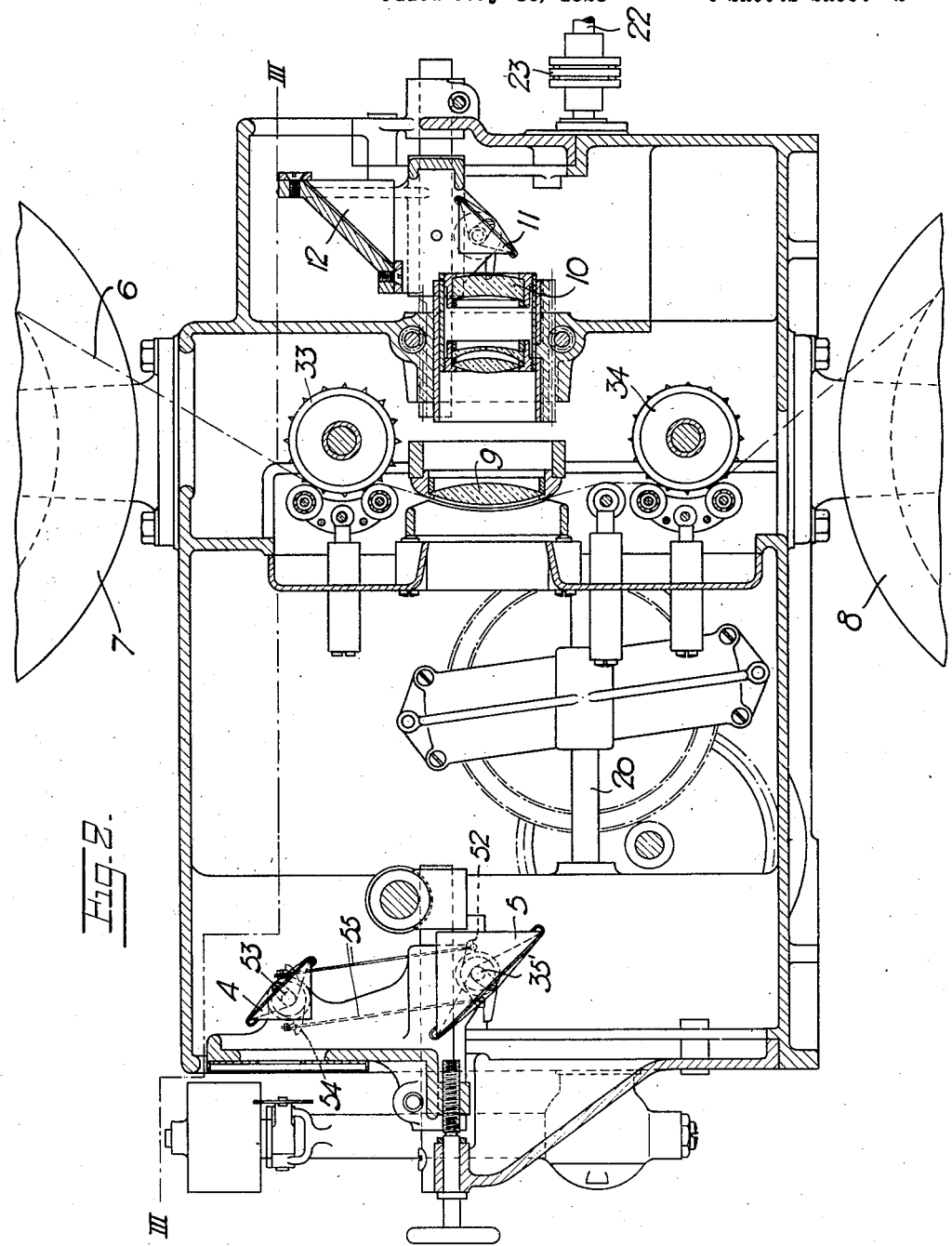

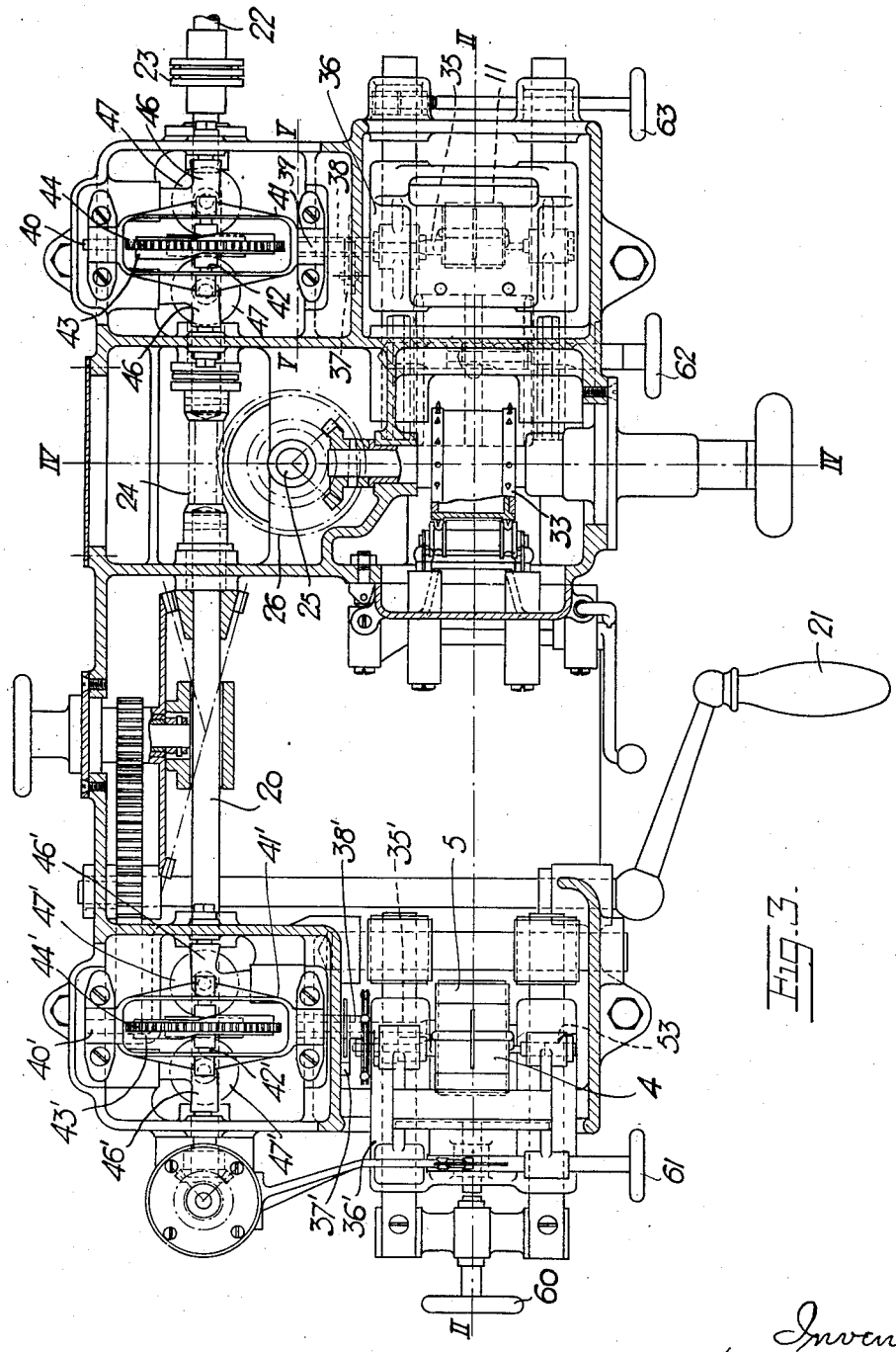

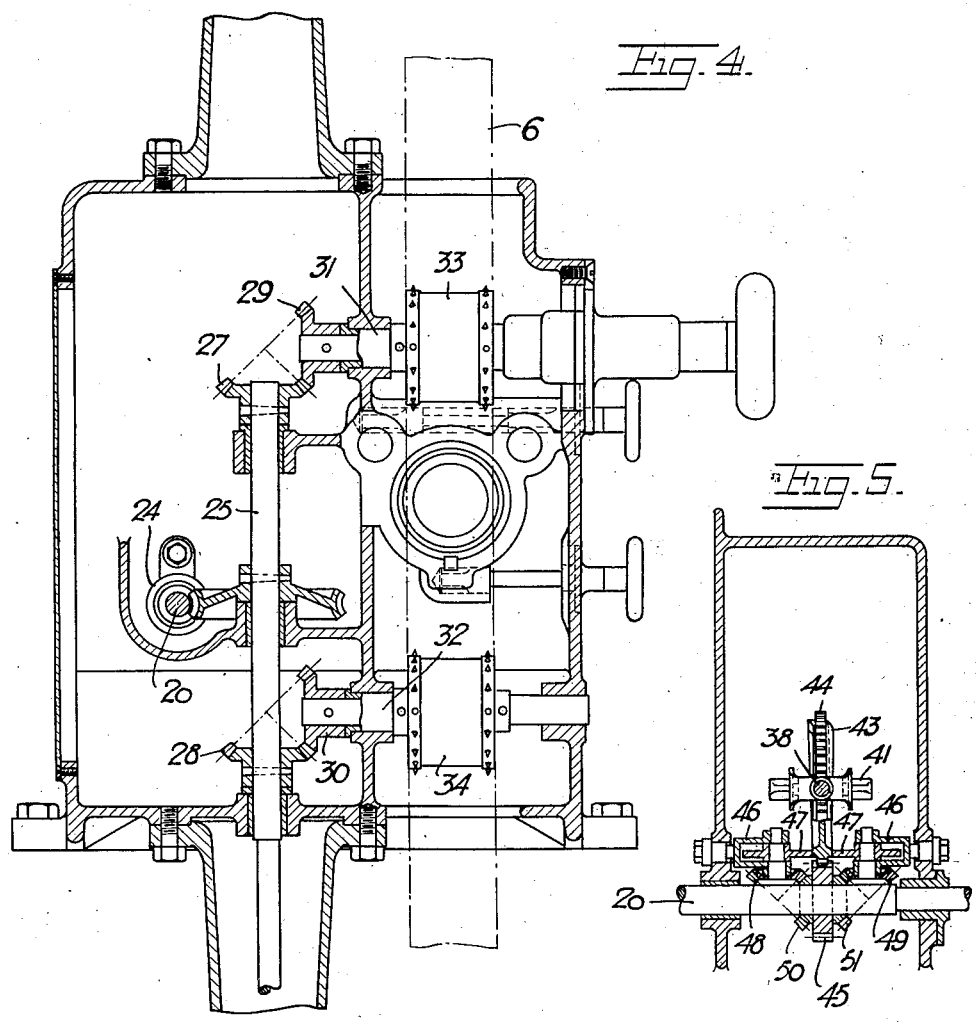

Patented May 10, 1932

1,857,559

UNITED STATES PATENT OFFICE

KARL OSKAR LEON, OF LIDKOPING, SWEDEN

MOVING PICTURE APPARATUS

Application filed July 30, 1928, Serial No. 296,143, and in Sweden August 4, 1927.

This invention relates to moving picture apparatus of the type in which the film is continuously moved.

The object of the invention is to provide simple means to compensate for the motion of each individual picture or photograph so that it will be stationary on the screen. To this end provision is made between the source of light and the film of a system of movable mirrors or prisms to project a beam of light through the film, causing said beam, while moving parallel to itself, to follow each individual photograph or picture during a sufficient portion of its movement. Furthermore, provision is made between the projecting lens and the screen of a prism or mirror or a system of prisms or mirrors which is or are movable in such a way as to reflect said moving beam on the same or substantially the same place on the screen.

In the accompanying drawings a moving picture apparatus according to this invention is shown by way of example. Fig. 1 is a diagram illustrating the optical system of the apparatus. Fig. 2 is a longitudinal section of the apparatus on the line II—II in Fig. 3. Fig. 3 is a horizontal section of the apparatus on the line III—III in Fig. 2. Fig. 4 is a cross section of the apparatus on the line IV—IV in Fig. 3. Fig. 5 is a detail section on the line V—V in Fig. 3.

With reference to the diagram shown in Fig. 1, the numeral 1 indicates a source of light the cone of light from which is concentrated by the lens 2 as a beam. Said beam is thrown through an opening of the same size as a picture of the film which is formed in a wall 3, and behind said wall the beam encounters a total reflecting prism 4. The light reflected by this prism is reflected by a similar prism 5 upon the film 6 which is assumed to move continuously from the reel 7 to the reel 8. The prisms 4 and 5 are caused, as by means now shown, to move simultaneously at equal angular speed in the same direction. The speed of rotation is so adjusted relatively to the movement of the film that the beam reflected upon the film by the prism 5 will move parallel to itself at the same speed as the film in such a way that the beam will follow each individual picture of the film a distance corresponding to the height of the picture, the prisms being then rapidly turned back again to repeat the same operation in respect to the next picture. In Fig. 1 the initial position of the beam as regards one picture of the film is indicated by dotted lines and the corresponding final position by full lines.

The beam after having passed through the film is converged by the lens 9 towards the objective 10 where it will be given the angle of picture necessary for the magnification. In order to prevent the picture from moving on the screen a prism 11 is provided situated after the objective 10 which is rotatable about a horizontal axis and is caused to swing about said axis synchronously with the movement of the prisms 4, 5 in such a way as to reflect the beam towards the same or substantially the same place of the screen. Between the prism 11 and the screen 13 there may be provided a stationary prism 12 to reflect the beam in a direction suitable for the projection, as shown in Fig. 1. As shown in this figure a certain displacement of each individual picture is taken place, viz. from the dotted position to the full line position, such displacement, however, may be eliminated or reduced to a neglectable amount by suitable adjustment of the rotation of the prism 11 and, eventually, also of the prism 12.

After the principle of the operation of the apparatus has thus been described above the design of the apparatus will now be more nearly explained with reference to Figs. 2–5 of the drawings.

The reference numeral 20 indicates the horizontal main shaft of the apparatus which may be operated either manually, as by means of the hand lever 21 geared to the shaft 20, or electrically as by a motor (not shown) the shaft 22 of which directly coupled to the shaft 20 by a preferably, flexible clutch 23. Secured to the shaft 20 is a worm 24 meshing with a worm wheel 26 carried by a vertical shaft 25. Secured to the shaft 25 are two bevel gear wheels 27 and 28 (see Fig. 4) meshing in the bevel gear wheels 29 and 30, respectively, secured to the shafts 31 and 32, respectively. Each of said shafts carries further a sprocket drum 33 and 34, respectively, to continuously move the film 6.

The means to effect the swinging movement of the prisms are designed as follows, it being noted that the means to operate the prism 11 will be first described (reference being had to Figs. 3 and 5). The prism 11 is secured to a shaft 35 rotatably mounted in a frame 36 that may slide in the longitudinal direction of the machine. The shaft 35 is connected by a crank shaped member 36 to a shaft 38 extending parallel to the shaft 35 which is mounted in the machine frame at 39 and 40. Intermediate between its ends, the shaft 38 is shaped as a strap 41 in which there is mounted a shaft 42 extending at right angles to the shaft 38. The shaft 42 carries a cam 43 and a toothed wheel 44 rigidly connected to said cam. The toothed wheel 44 meshes in a toothed wheel 45 secured to the main shaft 20 of the apparatus. Attached to the machine frame at each side of the cam 43 and the toothed wheel 44 is a bracket 46, and mounted in each such bracket upon journals at right angles to the shaft 38 is a rotatable roller 47 to guide the cam by engaging it from the side near its periphery. Attached to the shaft of each guide roller 47 is a bevel gear wheel 48 and 49, respectively, meshing in bevel gear wheels 50 and 51, respectively secured to the shaft 20.

The means to control the prisms 4 and 5 are of exactly the same design as described above in connection with the prism 11 and the details of said means are indicated by the same reference numeral as those used in connection with the control means of the prism 11 with addition of the index 1. The prism 4 is connected to the prism 5 by means of a disc 52 secured to the shaft $35^1$, a similar disc 54 secured to the shaft 53 of prism 4, and rods 55 interconnecting the discs.

The operation of the apparatus is as follows:

The rotation of the driving shaft 20 is transmitted through the worm gearing 24, 26 and the toothed gearings 28, 30 and 27, 29 to the film moving drums 33, 34 so that the film will be moved continuously. Furthermore, the movement is transmitted through the toothed wheels 44, 45 to the cams 43 to rotate same. Through the intermedium of the toothed gearings 48, 50 and 49, 51 the guide rollers 47 are also rotated at the same peripheral speed as the cams 43 whereby the wearing will be reduced to a minimum. The rotation of the cams 43 will cause the shafts 38, 38' with the straps 41, 41' to vibrate. The cams 43, 43' are of such a shape as to cause the straps to first swing in one direction through a certain angle and then more rapidly return in the opposite direction to their initial position. The vibration of the straps 41 is transmitted by means of the shafts 38, 38' and the clutch members 37, 37' to the prism carrying shaft 35 to cause the three prisms 4, 5 and 11 to vibrate synchronously. The ratio of gearing of the worm gearing 24, 26 and the toothed gearing 27, 29, 28, 30 and 44, 45 are so chosen as to cause the prisms to perform a cycle of operations during the period of time necessary for moving the film a distance corresponding to the height of one picture of the film.

The prism carrying frames 36, $36^1$ are, as already stated, adjustable in the longitudinal direction of the machine and their adjustment may be effected by means of hand wheels 60, 61 and 62, 63, respectively. This will permit adjustment of the vibration of the prisms, as the displacement of the frame will change position of the shaft 38 of the strap 41 relatively to the shaft 35 of the prisms thereby effecting a variation of the effective length of the clutch member 37.

It is further to be noted that modifications may be made without departing from the principle or scope of the invention. For instance, the prisms may be replaced by mirrors and, furthermore, the design of the means for operating the prisms or mirrors may be different from that illustrated.

What I claim is:

1. In a moving picture apparatus of the type having a source of light, means to produce a beam of light from said source, means to continuously move the film, a system of light reflecting means situated between said source and the film, an objective, other light reflecting means situated between said objective and a screen, and rotatably mounted parallel shafts to carry said light reflecting means, means to operate said shafts in synchronism comprising positively driven cam-discs rotatably mounted in straps rotatable about axes at right angles to the axes of the respective cam discs, and stationary means to guide said cam discs so as to cause them to oscillate about their axes upon rotation of the cam discs about their own axes, and connections between said straps and the rotatable shafts carrying the light reflecting means.

2. In a moving picture apparatus of the type having a source of light, means to continuously move the film, a system of light reflecting means situated between said source and the film, an objective, and other light reflecting means situated between said objective and a screen, rotatably mounted shafts to carry said light reflecting means, means to operate said shafts comprising positively driven cam-discs rotatably mounted in straps rotatable about axes at right angles to the axes of the respective cam discs, stationary means to guide said cam discs so as to cause the straps to oscillate about their axes upon the rotation of the cam discs about their own axes, and adjustable connections between said straps and the rotatable shafts carrying the light reflecting means.

3. In a moving picture apparatus of the type having a source of light, means to continuously move the film, a system of light reflecting means situated between said source of the film, an objective, other light reflecting means situated between said objective and a screen, and rotatably mounted parallel shafts to carry said light reflecting means, means to operate said shafts comprising positively driven cam-discs rotatably mounted in straps rotatable about axes at right angles to the axes of the respective cam discs, stationary guiding means to cause said straps to oscillate about their axes upon the rotation of the cam discs about their own axes, and crank shaped couplings connecting the shafts carrying the light reflecting means and the shafts of the straps, said shafts being laterally adjustable relatively to each other to effect variation of the ratio of gearing of said couplings.

4. In a moving picture apparatus of the type having a source of light, means to continuously move the film, a system of light reflecting means situated between said source and the film, an objective, other light reflecting means situated between said objective and a screen, and rotatably mounted parallel shafts to carry said light reflecting means, means to operate said shafts comprising positively driven cam discs rotatably mounted in straps rotatable about axes at right angles to the axes of the respective cam discs, stationary rollers to guide said cam discs so as to cause said straps to oscillate about their axes upon the rotation of the cam discs about their own axes, and crank shaped couplings connecting the shafts carrying the light reflecting means and the shaft of the straps, said light reflecting means together with their shafts being mounted in adjustable frames to enable variation of the ratio of gearings of said couplings.

In testimony whereof I have signed my name.

KARL OSKAR LEON.